(12) United States Patent
Ishii

(10) Patent No.: US 7,712,784 B2
(45) Date of Patent: May 11, 2010

(54) MOTORIZED SEATBELT RETRACTOR

(75) Inventor: Youma Ishii, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/835,535

(22) Filed: Aug. 8, 2007

(65) Prior Publication Data

US 2008/0054618 A1 Mar. 6, 2008

(30) Foreign Application Priority Data

Aug. 31, 2006 (JP) .............................. 2006-234866

(51) Int. Cl.
*B60R 22/36* (2006.01)

(52) U.S. Cl. ...................... 280/806; 280/807; 180/268; 701/45

(58) Field of Classification Search ................. 280/806, 280/807; 180/268, 274, 282; 701/45
See application file for complete search history.

(56) References Cited

U.S. PATENT DOCUMENTS

| | | | |
|---|---|---|---|
| 6,575,394 B1 | 6/2003 | Fujita et al. | |
| 6,729,650 B2* | 5/2004 | Midorikawa et al. | 280/807 |
| 6,997,474 B2* | 2/2006 | Midorikawa et al. | 280/735 |
| 7,028,802 B2* | 4/2006 | Tobata | 180/268 |
| 7,040,444 B2* | 5/2006 | Midorikawa et al. | 180/286 |
| 7,077,231 B2* | 7/2006 | Midorikawa | 180/268 |
| 7,201,399 B2* | 4/2007 | Frank et al. | 280/801.1 |
| 7,237,640 B2* | 7/2007 | Tobata | 180/268 |
| 7,343,999 B2* | 3/2008 | Cuddihy et al. | 180/268 |
| 2001/0004997 A1 | 6/2001 | Yano et al. | |
| 2005/0096818 A1* | 5/2005 | Fukuda et al. | 701/45 |
| 2006/0072911 A1 | 4/2006 | Bolz et al. | |

FOREIGN PATENT DOCUMENTS

| | | |
|---|---|---|
| EP | 1 300 303 A1 | 4/2003 |
| EP | 1 710 139 A1 | 10/2006 |
| EP | 1 790 540 A1 | 5/2007 |
| GB | 2 337 127 A | 11/1999 |
| JP | 2001-114069 A | 4/2001 |
| JP | 2001-199309 A | 7/2001 |
| JP | 2006-109692 A | 4/2006 |
| WO | WO 99/51469 A1 | 10/1999 |

OTHER PUBLICATIONS

European Search Report dated Nov. 12, 2007 (six (6) pages).
Japanese Office Action dated Nov. 18, 2008 including English translation (Four (4) pages).

* cited by examiner

*Primary Examiner*—Toan C To
(74) *Attorney, Agent, or Firm*—Crowell & Moring LLP

(57) ABSTRACT

Each ECU in a system configuration based on a motorized seatbelt retractor having an ECU combined with a motor shortens the harness length along which many currents flow as much as possible. A main ECU and a subsidiary ECU each have functions corresponding to those are provided to a control unit for controlling a motor for a motorized seatbelt retractor. The main ECU determines output start conditions and transmits commands, and the subsidiary ECU autonomously performs detailed motor current control and the like.

10 Claims, 10 Drawing Sheets

FIG. 8
(A) EMERGENCY OCCUPANT RESTRAINING MODE
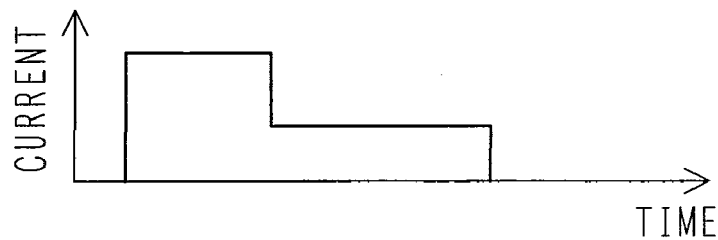
(B) WARNING MODE
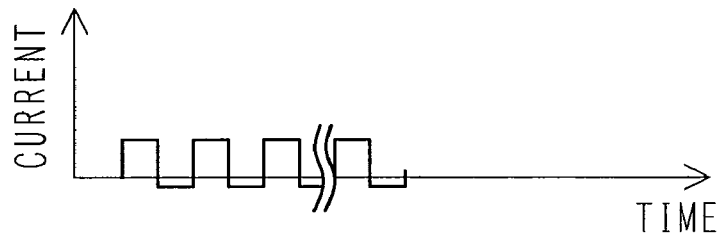
(C) CHILD SEAT FASTNING ASSISTANCE MODE
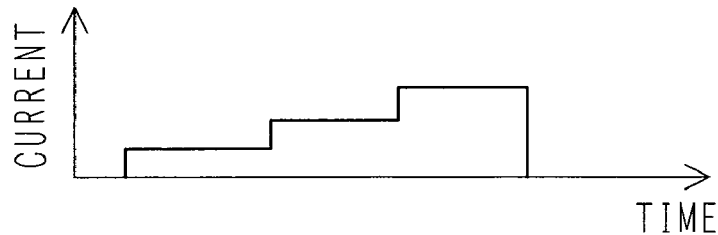
(D) SEATBELT FASTENING ASSISTANCE AND RETRACTING OPERATION
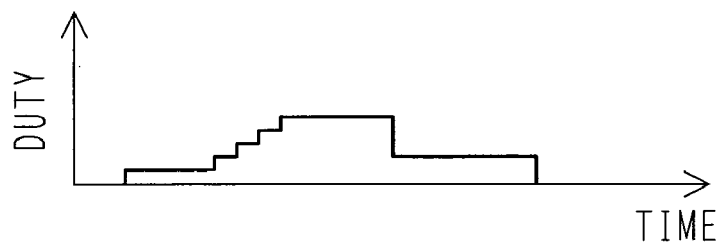

MOTORIZED SEATBELT RETRACTOR

BACKGROUND OF THE INVENTION

1. Field of the Invention

The present invention relates to a safety system for vehicles and, more particularly, to a motorized seatbelt retractor capable of retracting a seat belt by a motor.

2. Description of the Related Art

An automatic motorized seatbelt retractor capable of automatically retracting a seat belt is one of protective devices for protecting the passengers of a vehicle in the case of an accident. The automatic motorized seatbelt retractor applies a strong tension to the seat belt to retract the seat belt instantly when a collision is detected. To retract the seat belt by a high pulling force, the set belt retractor uses an explosive, a spring or a motor.

Whereas a motorized seatbelt retractor using an explosive can execute a set belt retracting operation only once, a motorized seatbelt retractor using a motor for retracting a seat belt can repeat a seat belt retracting operation any number of times. To make the best use of the distinctive feature of the motorized seatbelt retractor, trials have been made to apply the motorized seatbelt retractor to other purposes other than retracting the seat belt when collision occurs. A motorized seatbelt retractor disclosed in JP-A 2001-114069 retracts a seat belt for warning when collision is predicted.

SUMMARY OF THE INVENTION

As shown in FIG. 4, a known seat belt system has a control unit installed in an engine room, in a luggage room or on a dashboard. A motor driver for driving a motor is included in the control unit. A power line needs to be extended from the engine room to a position near a seat installed in a passenger room to connect the motor driver electrically to the motor. A current necessary for the motor to retract the seat belt is on the order of several tens amperes at the maximum. Usually, the motor driver includes a switching element. Therefore the current contains a harmonic component resulting from switching operations of the switching element. When a long harness carries a high current containing such a harmonic content from an electronic control unit (hereinafter, abbreviated to "ECU") to the motor of a motorized seatbelt retractor, the current generates noise and vibrations in some cases.

When a motorized seatbelt retractor is used not only for retracting a seat belt for occupant protection when a collision occurs or when collision is predicted but also for taking up a slack in a seat belt after the seat belt has been fastened, the frequency of operation of the motor of the motorized seatbelt retractor increases and it is therefore possible that noise caused by a driving current flowing through the power line spoils comfortableness in the passenger room.

According to the present invention, a motorized seatbelt retractor includes a driver ECU for controlling a motor driver for driving a motor to retract a seat belt, and connected by a communication line to a main ECU for controlling seat belt retracting operations.

Preferably, a current supply patterns corresponding to a plurality of operating modes are stored in the driver ECU, and the driver ECU receives an operation mode selection command from the main ECU and supplies a current to the motor in a current supply pattern corresponding to an operating mode specified by the operation mode selection command. The main ECU gives an operation mode selection command specifying an operating mode to the driver ECU.

The motor driver can be connected to the motor by the short power line and hence noises generated by a driving current for driving the motor can be reduced. Therefore, the comfort of the passenger compartment will not be spoiled even if the seat belt is retracted on occasions other than an occasion when collision occurred.

Preferably, the driver ECU is capable of autonomously controlling the motor even if a trouble, such as the breakage of a signal line, is caused by collision provided that the driver ECU has received a signal indicating a selected operating mode before the interruption of transmission of signals from the main ECU to the driver ECU.

BRIEF DESCRIPTION OF THE DRAWINGS

FIG. 8 is a diagram showing current supply patterns in which a current is supplied to a motor in different operating modes;

DESCRIPTION OF THE PREFERRED EMBODIMENTS

First Embodiment

Figure 1:
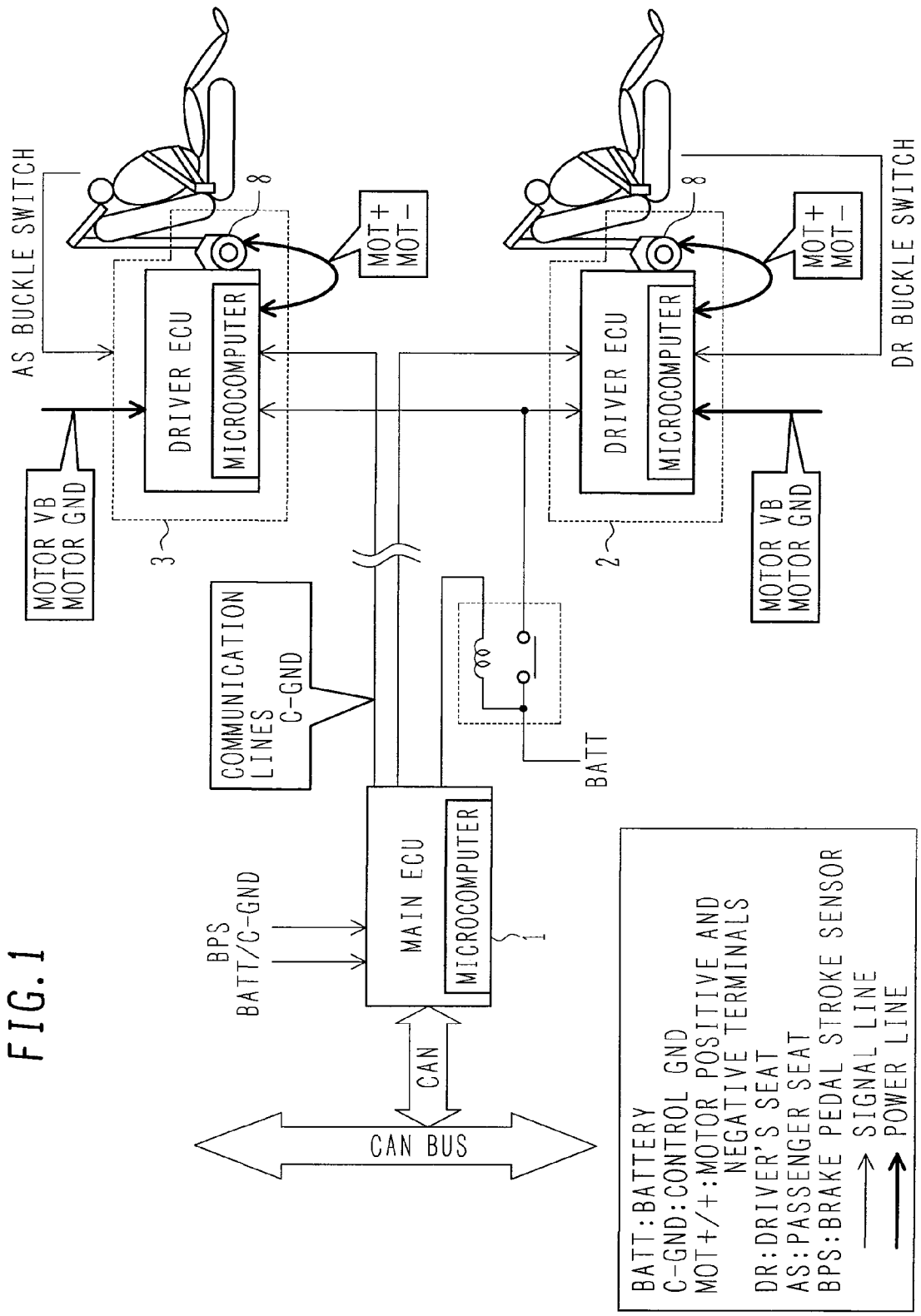
FIG. 1 is a block diagram of a motorized seatbelt retractor in a first embodiment according to the present invention provided with ECUs.

Referring to FIG. 1, a motorized seatbelt retractor in a first embodiment according to the present invention includes a main electronic control unit (hereinafter referred to as "main ECU") 1, a driver's seat driver electronic control unit (hereinafter, referred to as "DR driver ECU") 2, a passenger seat driver electronic control unit (hereinafter referred to as "AS driver ECU") 3 and motorized seat belt retractors 8.

The motorized seat belt retractors 8 are used respectively for retracting a driver's seat belt and a passenger's seat belt. The motorized seat belt retractors 8 are attached to parts of a vehicle body at positions beside a driver's seat and a passenger seat, respectively. The DR driver ECU 2 and the AS driver ECU 3 are held on the motorized seat belt retractors 8 by moldings or brackets, respectively. The DR driver ECU 2 and the AS driver ECU 3 are connected electrically to the motorized seat belt retractor 8 for the driver's seat and the motorized seat belt retractor 8 for the passenger seat, respectively, by bus bars and connectors.

The main ECU 1 is installed in an engine room, in a luggage room or on a dashboard. The main ECU 1 is connected to a controller area network (CAN) bus. The main ECU 1 is capable of communicating with on-board systems and on-board controllers through CAN communication.

The DR driver ECU 2 and the AS driver ECU 3 are connected by signal lines to the main ECU 1 for communication. The signal lines may be serial signal lines.

An on-board power supply supplies power through power lines, not shown, to the DR driver ECU 2 and the AS driver ECU 3. Thus the power is not supplied through the main ECU 1 to the DR driver ECU 2 and the AS driver ECU 3. The DR driver ECU 2 and the AS driver ECU 3 are connected to the main ECU 1 by only signal lines. Any power lines for carrying a high current are not used for connecting the DR driver ECU 2 and the AS driver ECU 3 to the main ECU 1. Power lines for carrying a heavy current are extended for a short distance between the DR driver ECU 2 and the motorized seat belt retractor 8 and between the AS driver ECU 3 and the motorized seat belt retractor 8. Thus generation of noise by switching the high current can be suppressed.

Figure 5:
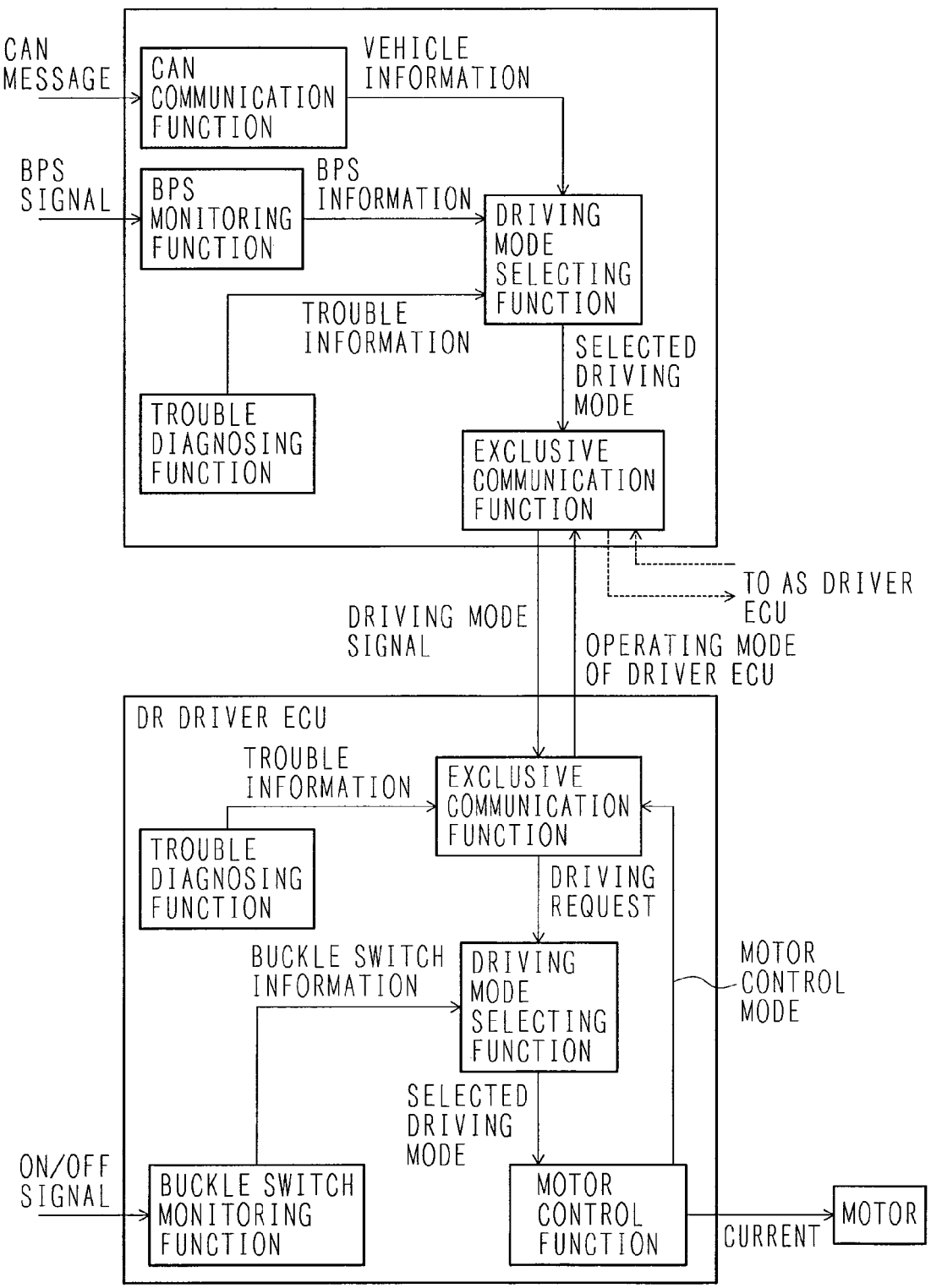
FIG. 5 is a block diagram of assistance in explaining the relation among functional components of the motorized seatbelt retractor in the first embodiment.

Respective operations of and functions assigned to the main ECU 1 and the DR driver ECU 2 will be described with reference to FIG. 5. The respective operations of and functions assigned to the main ECU 1 and the AS driver ECU 3 are the same as the operations of and the functions assigned to the DR driver ECU 2 and the main ECU 1 unless otherwise explained. Therefore, the AS drive ECU 3 is not shown in FIG. 5.

The main ECU 1 receives signals representing vehicle information about the condition of the vehicle given thereto through the CAN or directly given thereto. The main ECU 1 examines the received vehicle information to decide whether or not a seat belt retracting operation is to be executed. The vehicle information includes a vehicle speed, selected transmission gear ratio, distance from some other vehicle in proximity and relative speed with respect to the other vehicle in proximity measured by a radar or the like, door condition, the status of a child seat flag and the condition of the brake pedal.

The motorized seatbelt retractor in the first embodiment sets conditions for retracting the seat belt for purposes other than a purpose for restraining the vehicle occupant during collision. The seat belt needs to be retracted in different retraction modes for different purposes, respectively. For example, the seat belt needs to be retracted at different speeds and to exert different restraining forces for an ordinary function to take up a slack in the seat belt and an emergency function to restrain the vehicle occupant at a collision, respectively. Different current supply patterns are determined for different operating modes, respectively, and mode selecting conditions for selecting the different operating modes are determined. The motorized seatbelt retractor in the first embodiment can operate in the following four operating modes shown in FIG. 8; an emergency occupant restraining mode (FIG. 8A), a warning mode (FIG. 8B), a child seat fastening assistance mode (FIG. 8C) and a seat belt fastening assistance mode and a full retraction mode. Conditions for selecting those four operating modes will be described later.

The main ECU 1 decides whether or not a condition for selecting one of the four operating modes is satisfied on the basis of the received vehicle information. If a condition for selecting one of the operating modes is satisfied, the main ECU 1 sends a command signal, namely, a selected operating mode signal representing the selected operating mode, to the DR driver ECU 2 and the AS driver ECU 3.

The DR driver ECU 2 and the AS driver ECU 3 stores the current supply patterns for the operating modes shown in FIG. 8. The DR driver ECU 2 and the AS driver ECU 3 supply a current to the motors in the current supply pattern for the operating mode stored therein and specified by the command signal.

The DR driver ECU 2 and the AS driver ECU 3 for driving the motors of the motorized seat belt retractors 8 are separated from the main ECU 1 and are disposed near the motors. Power is supplied directly from the on-board power supply to the motors of the motorized seat belt retractors 8. The DR driver ECU 2 and the AS driver ECU 3 store the predetermined operating modes. Thus power can be supplied to the motors of the motorized seat belt retractors 8 without fail even if the communication lines connecting the DR driver ECU 2 and the AS driver ECU 3 to the main ECU 1 are broken by the impact exerted thereon by collision, and the motorized seat belt retractors 8 can accomplish the predetermined seat belt retracting operation provided that the DR driver ECU 2 and the AS driver ECU 3 have received a signal indicating a selected operating mode before the communication lines are broken.

The main ECU 1 has a CAN communication function to acquire vehicle information by CAN communication, a BPS monitoring function to monitor sensors including a brake pedal stroke sensor (BPS) and switches by directly reading signals from the sensors without using CAN communication, a malfunction diagnosing function to diagnose troubles in sensors and switches for monitoring the main ECU 1 and vehicle condition, a motor driving mode selecting function to determine a motor driving mode in which the motors of the motorized seat belt retractors 8 are to be driven on the basis of the acquired vehicle information and to give a signal indicating the selected motor driving mode to the DR driver ECU 2 and the AS driver ECU 3 through exclusive communication lines, and a driver ECU monitoring function to monitor the DR driver ECU 2 and the AS driver ECU 3.

The DR driver ECU 2 and the AS driver ECU 3 have a motor control function to control the rotating direction of the output shafts of the corresponding motors and currents supplied to the corresponding motors, a seat belt buckle switch monitoring function to read a signal indicating the condition of a seat belt buckle proper to a seat and to monitor the condition of the seat belt buckle, a diagnosing function to diagnose troubles in the motorized seat belt retractors 8, the DR driver ECU 2 and the As driver ECU 3, and an information sending function to send information about the DR driver ECU 2 and the AS driver ECU 3 through an exclusive communication line to the main ECU 1.

Figure 9:
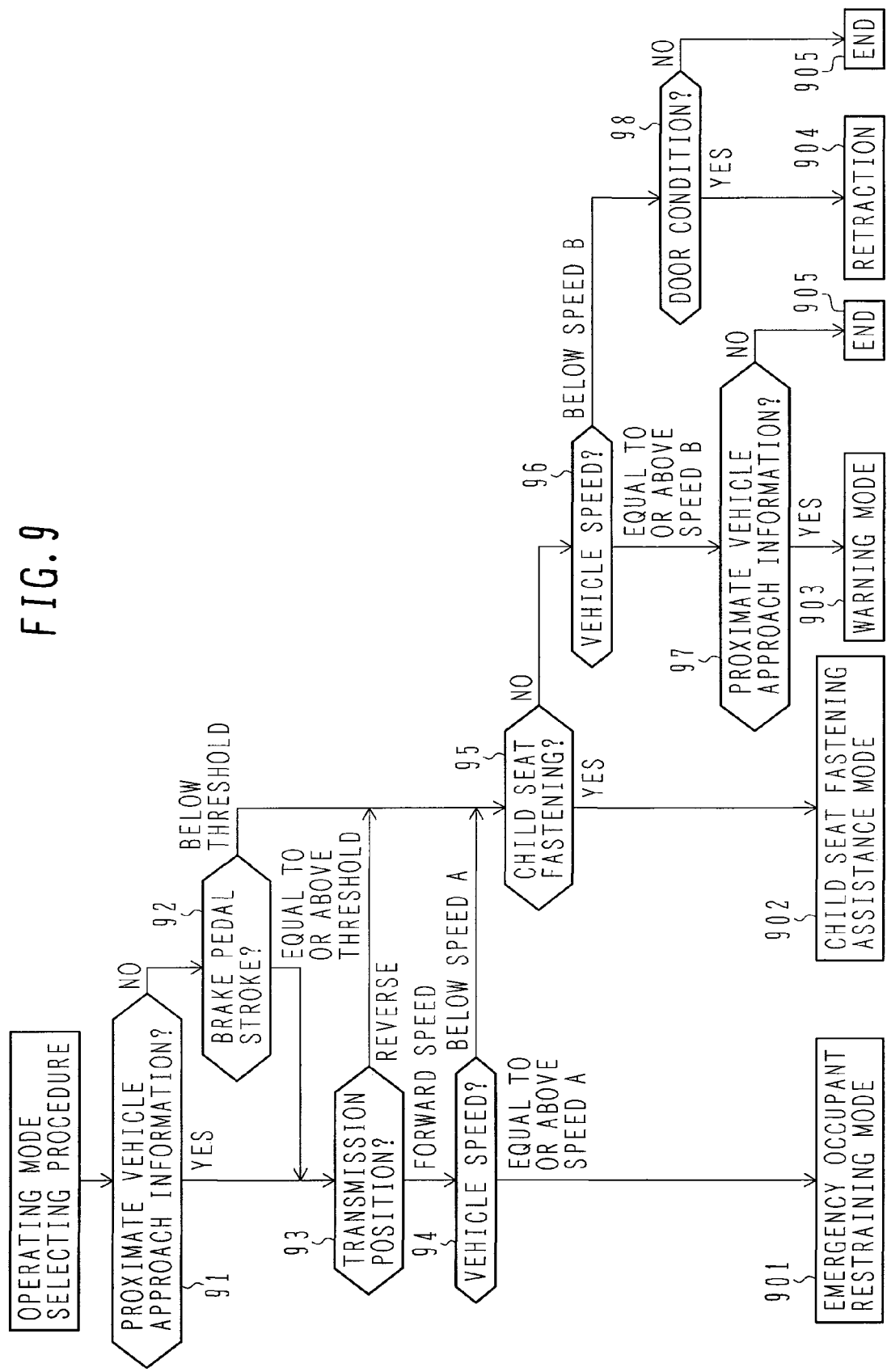
FIG. 9 is a flow chart of an operating mode selecting procedure to be carried out by a main ECU to select an operating mode.

FIG. 9 is a flow chart showing decision conditions for an operating mode selecting procedure to be carried out by the main ECU 1. The highest priority is given to an emergency occupant restraining mode. The emergency occupant restraining mode is selected when the vehicle is traveling at a vehicle speed exceeding a predetermined vehicle speed, the transmission is set for a forward speed and a decision that collision is unavoidable is made on the basis of proximity information about distance from some other vehicle in proximity and relative speed with respect to the other vehicle or when a brake pedal stroke exceeds a predetermined limit brake pedal stroke, i.e., when emergency full braking is made. The child seat fastening assistance mode is selected when the emergency occupant restraining mode is not selected and a seat belt fastening assistance flag is set to the 1 state. The warning mode is selected in a state where neither of the emergency occupant restraining mode and the child seat fastening assistance mode is selected, the vehicle speed is above a predetermined vehicle speed and when it is decided that collision is unavoidable from the proximity information. The full retraction mode is selected when the vehicle speed is not higher than the predetermined vehicle speed and the door is opened in a state where neither of the emergency occupant restraining mode and the child seat fastening assistance mode is selected.

Conditions for selecting those modes will be described with reference to the flow chart. In step 91, decision whether or not collision is avoidable is made on the basis of distance from the other vehicle in proximity and relative speed with respect to the other vehicle. If it is decided that collision is unavoidable, step 93 is executed. In step 93 decision whether or not the transmission is set in reverse is made. If the transmission is set for a speed other than reverse, step 94 is executed. In step 94, decision whether or not the vehicle speed is not lower than a predetermined first reference speed A is made. If it is decided in step 94 that the vehicle speed is not lower than the first reference speed A, the emergency occupant restraining mode 901 is selected. If it is decided in step 93 that the transmission is set in reverse or it is decided in step 94 that the vehicle speed is below the first reference speed A, step 95 is executed. It is possible that the occupant is not seated on the seat in a correct position when the transmission is set in reverse or the vehicle speed is low. That is, it is highly possible that the driver is looking back when the transmission is set in reverse or the passenger is preparing to alight from the vehicle when the vehicle speed is low. If the seat belt is retracted in the emergency occupant restraining mode while the driver is not seated on the seat in a correct position or the driver is looking back, it is possible to injure the driver seriously.

Step 92 is executed if it is decided in step 91 that collision is avoidable. In step 92, it is decided whether or not a brake pedal stroke is not smaller than a predetermined brake pedal stroke on the basis of the output of the brake pedal stroke sensor. If the brake pedal stroke is not smaller than the predetermined brake pedal stroke, the operating mode selecting procedure jumps to step 93 to see if the emergency occupant restraining mode is to be selected. The decision that collision is avoidable made on the basis of the vehicle information is not absolutely correct. Therefore, even if it is decided on the basis of signals provided by the sensors that collision is avoidable, it is decided that collision is unavoidable and the motorized seatbelt retractor is made to operate accordingly when the driver jammed on the brakes.

If it is decided in step 92 that the brake pedal stroke is below the predetermined brake pedal stroke, it is decided that collision is avoidable and step 95 is executed. In step 95, it is decided whether or not a signal representing a child seat fastening assistance flag is received. Although the status of the child seat fastening assistance flag may be estimated from signals provided by the switches and a seated person detector, it is desirable to set the child seat fastening assistance flag in the 1 state when a push button, for operating a child seat switch, placed on the dashboard or the instrument panel of the vehicle is pushed. When the child seat fastening assistance mode is selected, a structure other than a person needs to be firmly fastened to the seat. Therefore, a comparatively strong force is applied stepwisely the structure as shown in FIG. 8. Therefore, it is desirable to provide the vehicle with a switch for avoiding selecting the child seat fastening assistance mode while the occupant is seated on the seat.

If it is decided that the signal indicating the child seat fastening assistance flag is not received, step 96 is executed to decide whether or not the vehicle speed is not lower than a predetermined second reference speed B lower than the first reference speed A. If it is decided in step 96 that the vehicle speed is not lower than the second reference speed B, step 97 is executed to decide whether or not the vehicle is in danger of collision. The warning mode is selected if it is decided in step 97 that the level of the danger of collision is not lower than a predetermined reference level. If it is decided that the level of the danger of collision is below the predetermined reference level, none of those operating modes is selected and the operating mode selecting procedure is ended in step 905, and then the next cycle of the operating mode selecting procedure is started from step 91.

If it is decided in step 96 that the vehicle speed is below the second reference speed B, step 98 is executed to see whether or not the door is opened. If it is decided in step 98 that the door is opened, the full retraction operation is executed in step 904. In step 904, the seat belt is fully retracted to hold the seat belt at its home position on an assumption that the passenger has alighted from the vehicle. If it is not decided in step 98 that the door is opened, none of the operating modes is selected and the operating mode selecting procedure is ended in step 905, and then the next cycle of the operating mode selecting procedure is started from step 91.

When it is decided that the seat belts be retracted in the selected operating mode, the main ECU 1 sends an operating mode signal indicating the selected operating mode in which the seat belts are to be retracted to the DR driver ECU 2 and the AS driver ECU 3. Upon the reception of the operating mode signal from the main ECU 1, the DR driver ECU 2 and the AS driver ECU 3 supply a current in a current supply pattern specified by the selected operating mode to their motors when it is decided from the condition of the buckle switches being monitored by the DR driver ECU 2 and the AS driver ECU 3 that the seat belts can be retracted in the selected operating mode.

Figure 10:
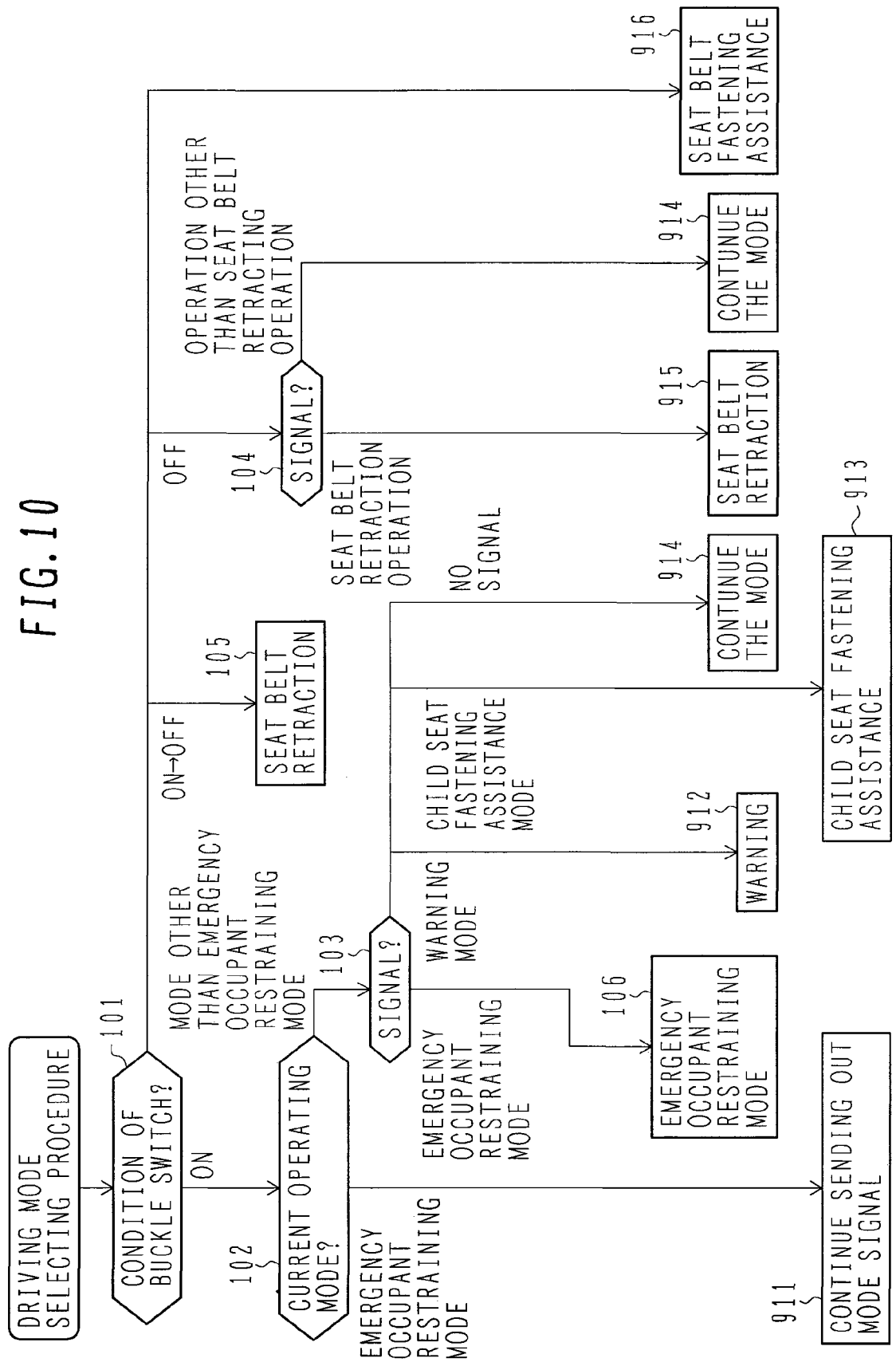
FIG. 10 is a flow chart of a driving mode selecting procedure to be carried out by a driver ECU to determine a driving mode.

FIG. 10 is a flow chart showing decision conditions for a driving mode selecting procedure to be carried out by the driver ECU. Even if the conditions for selecting some of the operating mode by the main ECU 1 are satisfied, in some cases there are conditions for stopping the execution of the operating mode selected by the main ECU 1 on the side of the DR driver ECU 2 and the AS driver ECU 3. For example, in a state where the buckle switch for the seat is open, the seat belt of the seat should not be retracted even if the main ECU 1 gives a signal indicating the emergency occupant restraining mode to the driver ECU. The driving mode selecting procedure will be described with reference to FIG. 10.

The buckle switch for the seat is closed when the occupant seated on the seat fastens the seat belt. In such a state, a driving mode is determined from the operating mode signal indicating the emergency occupant restraining mode, the child seat fastening assistance mode or the warning mode, and the currently effective operating mode. When the seat belt retracting operation is being executed in the emergency occupant restraining mode or when the operating mode specified by the operating mode signal received from the main ECU 1 is the same as the operating mode in which the seat belt retracting operation is being executed, the seat belt retracting operation in the currently selected operating mode is continued until the seat belt retracting operation is completed. In a state where the emergency occupant restraining mode is not selected and an operating mode signal indicating the operating mode different from the operating mode in which the seat belt retracting operation is being executed is received from the main ECU 1, it is decided to execute the seat belt retracting operation in the operating mode indicated by the operating mode signal. When an operating mode signal indicating the full retraction mode is received in a state where the buckle switch is open, the seat belt retracting operation is executed in the full retraction mode. Even if any operating mode signal is not given by the main ECU 1, the operating mode is selected according to the change of the condition of the buckle switch. When the closed buckle switch is opened it is decided that the seat belt retracting operation in the full retraction mode is to be started. When the open buckle switch is closed, the seat belt fastening assistance mode is selected.

The main ECU 1 gives a driving start command to the DR driver ECU 2 and the AS driver ECU 3 to make the DR driver ECU 2 and the AS driver ECU 3 start a driving control operation. The control operation may be achieved by periodically exchanging information about a desired current to be supplied to the motors and currents currently supplied to the motors among the ECUs instead of using commands. However, the motors become uncontrollable if the exclusive communication lines are broken while currents are supplied to the motors, and currents cannot be supplied to the motors in the current supply pattern shown in FIG. 8 until the seat belt retracting operation is completed.

Therefore, the main ECU 1 sends out only operating mode signals and current supply patterns respectively for the operating modes specified by the operating mode signals are stored in the DR driver ECU 2 and the AS driver ECU 3. Currents or duty for the operating modes and current supply times for supplying currents to the motors in the current supply patterns shown in FIG. 8 are stored in the DR driver ECU 2 and the AS driver ECU 3. Since the DR driver ECU 2 and the AS driver ECU 3 hold the data on current supply patterns and have motor driving and controlling functions, the DR driver ECU 2 and the AS driver ECU 3 can determine a driving mode only on the basis of information about the condition of the buckle switches and the currently selected operating mode specific to the seats and can drive and control the associated motors even if the main ECU 1 is inoperative.

Second Embodiment

Figure 2:
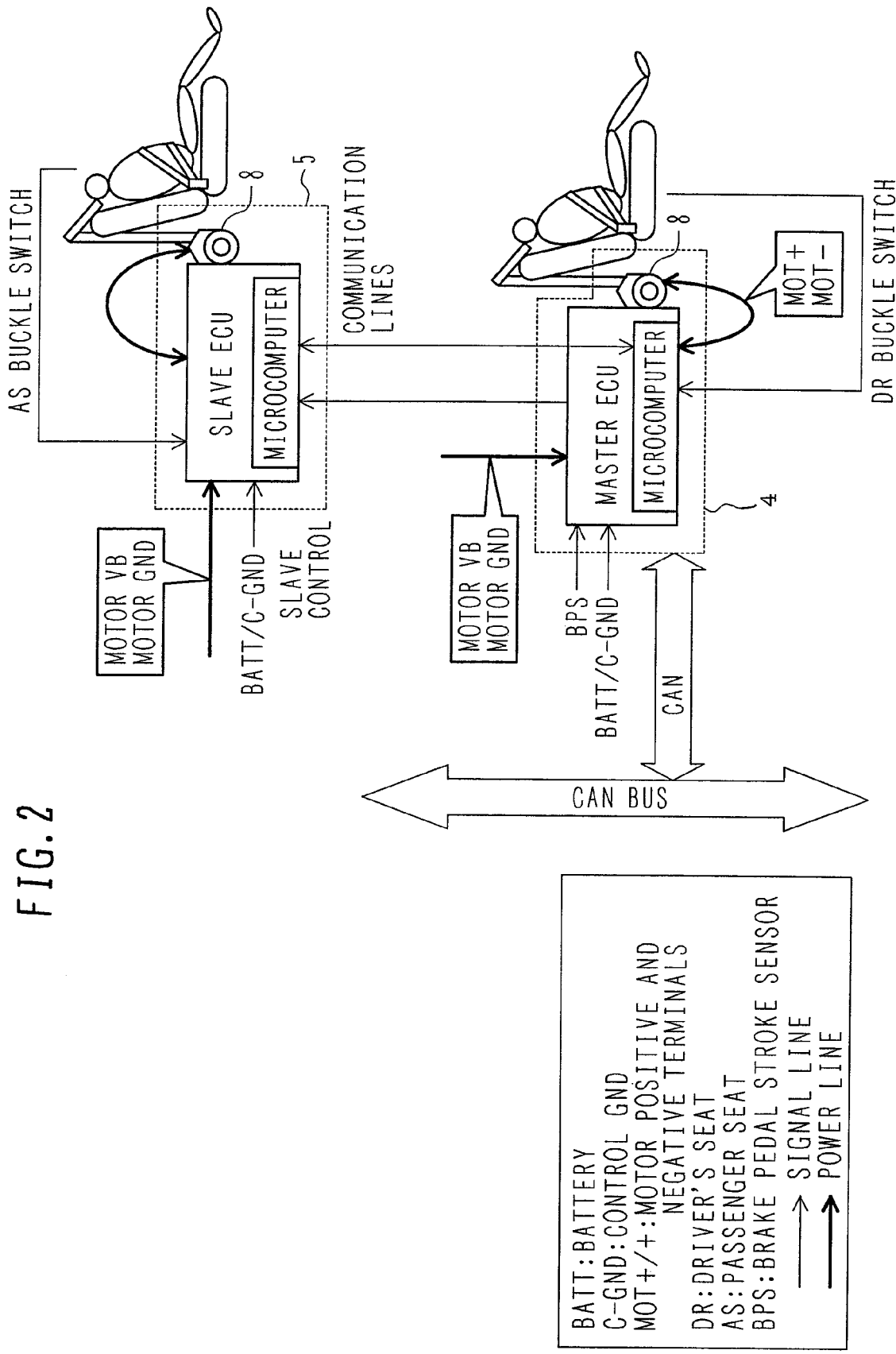
FIG. 2 is a block diagram of a motorized seatbelt retractor in a second embodiment according to the present invention provided with ECUs.

FIG. 2 shows a motorized seatbelt retractor in a second embodiment according to the present invention. The motorized seatbelt retractor in the second embodiment has a master ECU 4 having the functions of the main ECU 1 and the DR driver ECU 2 of the motorized seatbelt retractor in the first embodiment, and a slave ECU 5 corresponding to the AS driver ECU 3 of the first embodiment. Accordingly, the details of operating modes, conditions for operating ode selection and conditions for executing operating odes are the same as those for the first embodiment shown in FIGS. 8, 9 and 10 unless otherwise specifically described.

In the second embodiment, the master ECU 4 is integrated with a motor included in a motorized seat belt retractor 8 combined with a driver's seat, and the slave ECU 5 is integrated with a motor included in a motorized seat belt retractor 8 combined with a passenger seat.

Figure 6:
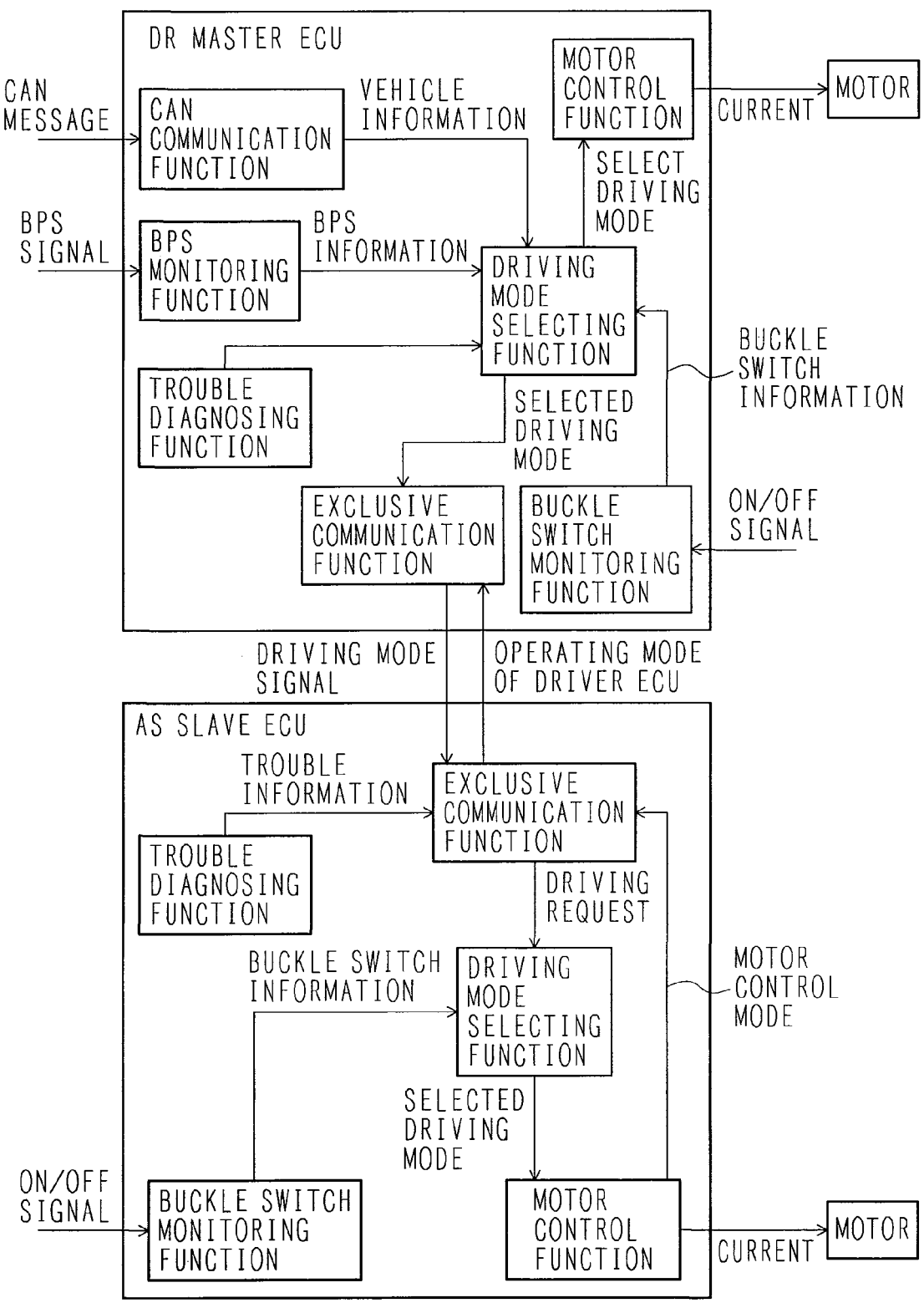
FIG. 6 is a block diagram of assistance in explaining the relation among the functional components of the motorized seatbelt retractor in the second embodiment.

Functions of the motorized seatbelt retractor in the second embodiment are shown in FIG. 6.

The master ECU 4 has functions of the main ECU 1 of the first embodiment excluding those relating with the motorized seat belt retractor 8 combined with the passenger seat, and those of the DR driver ECU 2 of the first embodiment. The functions of the master ECU 4 includes a CAN communication function to acquire vehicle information by CAN communication, a BPS monitoring function to monitor sensors including a brake pedal stroke sensor and a seat belt buckle switch by directly reading signals from the sensors and the buckle switch without using CAN communication, a malfunction diagnosing function to diagnose troubles in sensors for monitoring the master ECU 4, switches associated with the driver's seat, and the motorized seat belt retractor, a motor driving mode selecting function to determine a motor driving mode in which the motor of the motorized seat belt retractor 8 is to be driven on the basis of the acquired vehicle information, and a slave ECU control function to control the slave ECU 5 by sending signals through an exclusive communication line to the slave ECU 5, a slave ECU monitoring function, and a motor control function to control the motor of the motorized seat belt retractor 8 combined with the driver's seat.

The slave ECU 5 has a motor control function to control the motor of the motorized seat belt retractor 8 combined with the passenger seat, a seat belt buckle monitoring function to receive a signal directly from a seat belt buckle switch associated with the seat belt buckle of the seat belt combined with the passenger seat and to monitor the seat belt buckle, a malfunction diagnosing function to diagnose troubles in the slave ECU 5, and a communication function to send information about the slave ECU 5 to the master ECU 4.

Decision conditions for selecting an operating mode are the same as those mentioned above in connection with the first embodiment. The master ECU 4 carries out the operating mode selecting procedure expressed by the flow chart shown in FIG. 9 to select an operating mode. The master ECU 4 sends a signal indicating the selected operating mode through an exclusive communication line to the slave ECU 5. Then, the slave ECU 5 carries out the driving mode selecting procedure shown in FIG. 10 showing decision conditions to select a driving mode, and drives the motor of the motorized seat belt retractor 8 combined with the passenger seat in the selected driving mode. A driving mode in which the motor of the motorized seat belt retractor combined with the driver's seat is driven is determined by processing data by a computer included in the mater ECU according to procedures expressed by the flow charts shown in FIGS. 9 and 10.

The motorized seatbelt retractor in the second embodiment does not need any communication function to communicate with the motorized seat belt retractor 8 combined with the driver's seat and needs the two ECUs. Thus the motorized seatbelt retractor in the second embodiment is advantageous in cost over the motorized seatbelt retractor in the first embodiment. However, the master ECU 4 for controlling the motor of the motorized seat belt retractor 8 combined with the driver's seat needs to have additional functions of the master ECU 4 in addition to those of the driver ECU 2 and is large. Therefore, an increased space is needed to install the master ECU 4.

Third Embodiment

Figure 3:
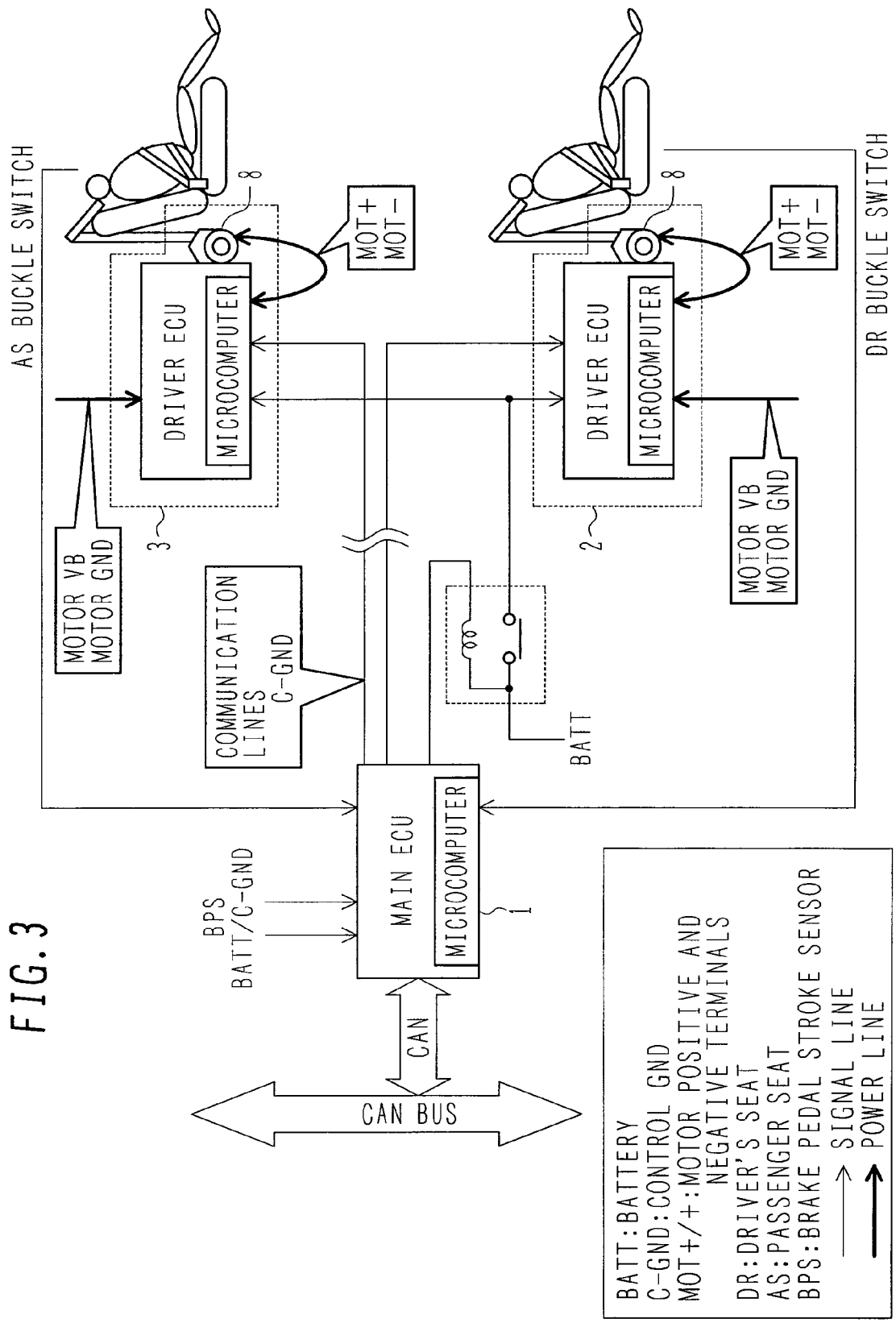
FIG. 3 is a block diagram of a motorized seatbelt retractor in a third embodiment according to the present invention provided with ECUs.
Figure 4:
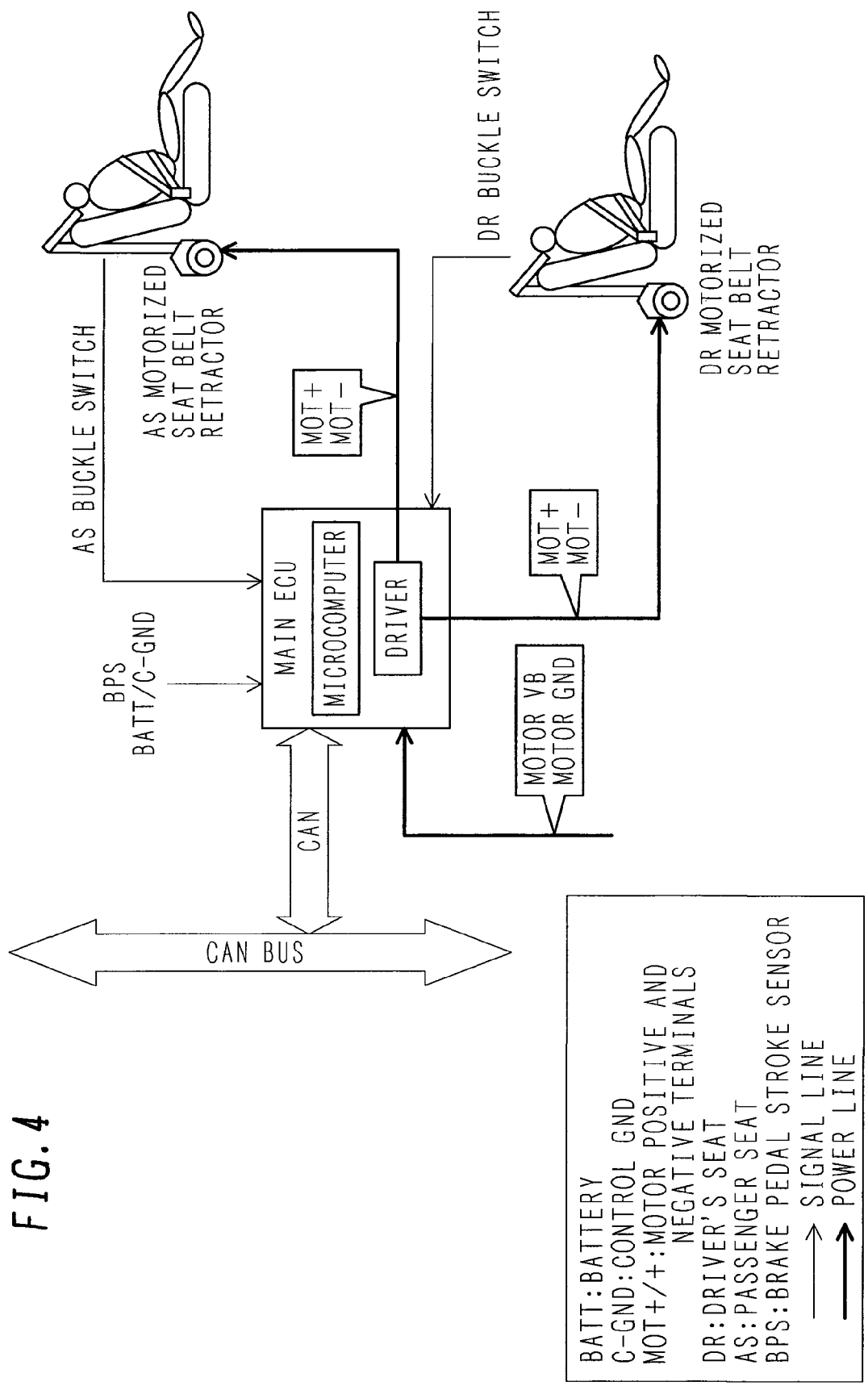
FIG. 4 is a block diagram of a known motorized seatbelt retractor.

FIG. 3 shows a motorized seatbelt retractor in a third embodiment according to the present invention. Whereas the motorized seatbelt retractor in the first embodiment gives information about the condition of the buckle switches to the DR driver ECU 2 and the AS driver ECU 3, the motorized seatbelt retractor in the third embodiment gives information about the condition of the buckle switches to a main ECU 1.

Figure 7:
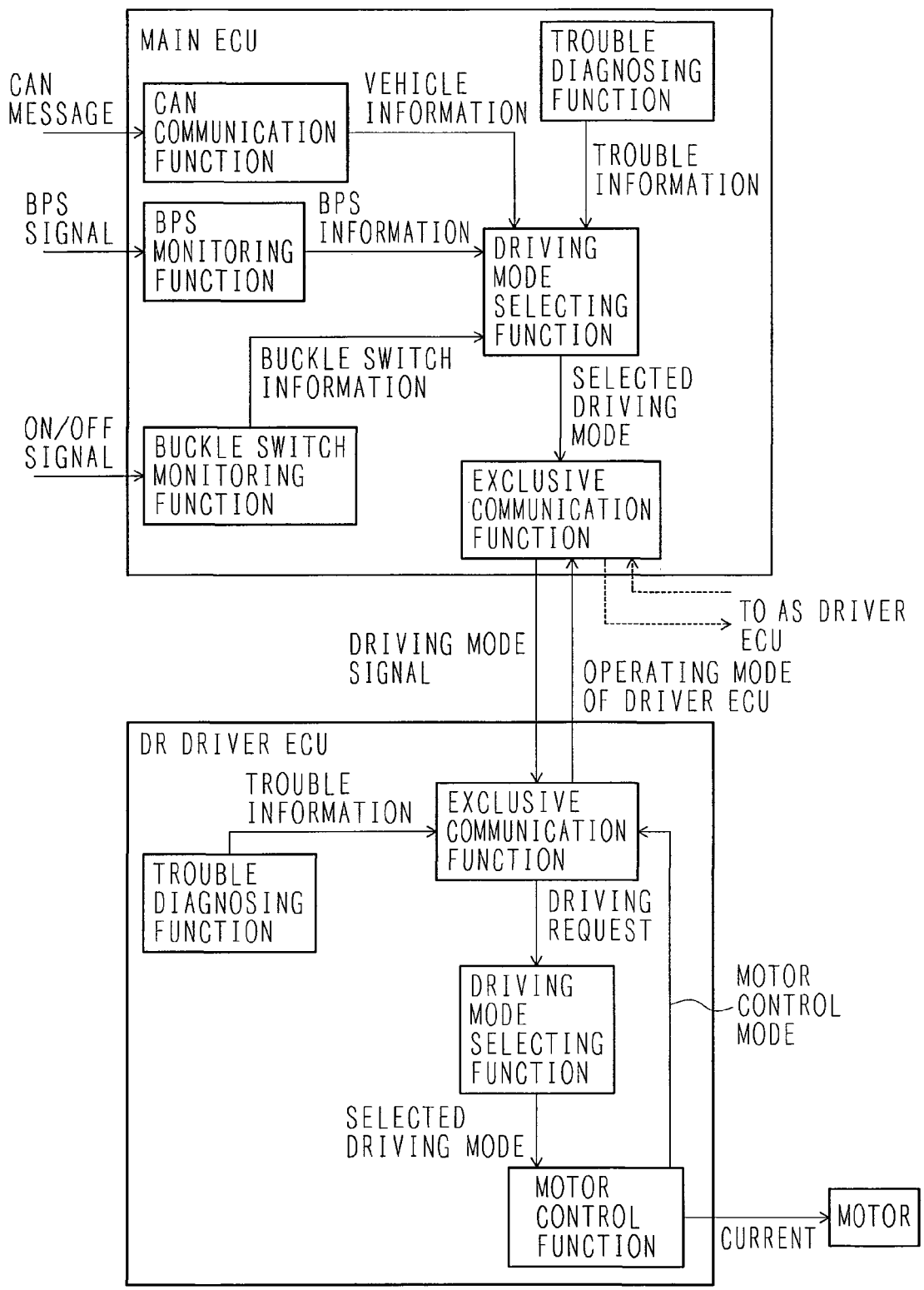
FIG. 7 is a block diagram of assistance in explaining the relation among functional components of the motorized seatbelt retractor in the third embodiment.

Functions of the motorized seatbelt retractor in the third embodiment are shown in FIG. 7. A main ECU 1 included in the motorized seatbelt retractor in the third embodiment has functions to receive signals from seat belt buckle switches associated with the driver's seat and the passenger seat and to monitor the seat belt buckle switches in addition to those of the main ECU 1 of the first embodiment. The main ECU 1 has a CAN communication function to acquire vehicle information by CAN communication, a monitoring function to monitor sensors including a brake pedal stroke sensor and switches including a seat belt buckle switch associated with the driver's seat by directly reading signals from those sensors and the seat belt buckle switch without using CAN communication, a malfunction diagnosing function to diagnose troubles in the main ECU 1, a motorized seat belt retractor operating mode selecting function to determine a motorized seat belt retractor operating mode, an operation requesting function to request the driver ECU 2 to operate, and a driver ECU monitoring function to monitor the DR driver ECU 2 and the AS driver ECU 3.

Operations of the main ECU 1 of the third embodiment are similar to those of the main ECU 1 of the first embodiment. The main ECU receives input signals representing vehicle information through CAN or directly, and determines a seat belt retracting mode on the basis of the vehicle information. The vehicle information includes, in addition to a vehicle speed, selected transmission gear ratio, distance from some other vehicle in proximity and relative speed with respect to the other vehicle in proximity measured by a radar or the like, door condition, the status of a child seat flag and the condition of the brake pedal which are given to the main ECU 1 of the first embodiment, information about the condition of the seat belt buckle switches, which is given to the driver ECUs in the first embodiment. The main ECU 1 selects a driving mode on the basis of the vehicle information and gives a signal indicating the selected driving mode through an exclusive communication line to the driver ECU 2. The ECU 2 drives the motor of the seat belt retractor in the driving mode. The main ECU 1, similarly to that of the second embodiment, carries out the operating mode selecting procedure expressed by the flow chart shown in FIG. 9 to select an operating mode and carries out the driving mode selecting procedure expressed by the flow chart shown in FIG. 10 top determine a driving mode in which the motor of the motorized seat belt retractor is to be driven.

In the third embodiment, the information about the buckle switches is processed by the main ECU 1. Therefore, timely information about the condition of the buckle switches is unavailable. However, the condition of the buckle switches is monitored by the main ECU 1, the driver ECUs can be formed in a simple, small configuration, and hence the driver ECUs can be installed in a small space.

The functions of the main ECU 1 of each of the first and the third embodiment can be incorporated into an ECU of another on-board system having a CAN communication function. A microcomputer and peripheral circuits can be used in common to exercise the foregoing functions by incorporating the functions of the main ECU 1 of each of the first and the third embodiment, for example, into a distance measuring system that measures distance between the vehicle and some other vehicle in proximity, a brake assist system or a controller for controlling air bags. Consequently, the number of parts can be reduced.

Although the first to the third embodiment have been described as applied to the motorized seatbelt retractor including the motorized seat belt retractors for retracting the seat belts respectively combined with the driver's seat and the passenger seat, those motorized seatbelt retractors can be used also to retract a seat belt combined with a rear seat in addition to the seat belts respectively combined with the driver's seat and the passenger seat by connecting a driver ECU associated with the seat belt combined with the rear seat to the main ECU and connecting a slave ECU associated with the seat belt combined with the rear seat to the master ECU.

Thus the power line for supplying power to the motors of the motorized seat belt retractors may be short and hence noise attributable to radiation from the power line can be reduced. The motorized seat belt retractors can be repeatedly used, in addition to securely holding the occupants during collision, for ordinary operations for operating the seat belts, such as operations for facilitating fastening and unfastening the seat belts. Even if the communication lines are broken at a collision, the driver ECUs of the motorized seat belt retractors combined with the sets can make the seat belts achieve at least necessary safety measures to insure the safety of the occupants.

What is claimed is:

1. A seatbelt retractor controlling system, comprising:
    a motor configured to generate a rotational torque for driving a seatbelt retractor;
    a first electric control unit comprised of a first micro computer for controlling a rotational speed of said motor; and
    a second electric control unit comprised of a second micro computer which can communicate with an on-board controller or on-vehicle sensor;
    wherein said second micro computer comprises a driving mode selecting portion which selects one of driving modes for controlling said motor based on a signal from said on-board controller or a sensor; and
    said first micro computer acquires a buckle switch signal about the on-off state of a buckle switch corresponding to seat belt retractor without passing through said communication line, and selects one of driving modes stored previously in said first micro computer based on the selected mode of said driving mode selecting portion, and controls a driving current supplied to said motor based on the buckle switch signal and the selected driving mode.

2. The seatbelt retractor controlling system according to claim 1, wherein
    said first electric control unit is supplied with electric power from a power source but not supplied through said second electric control unit.

3. The seatbelt retractor controlling system according to claim 1, wherein
    said first electric control unit communicates with said on-board controller through a CAN communication, and
    said second electric control unit receives said signal from said sensor without passing the CAN communication.

4. The seatbelt retractor controlling system according to claim 1, further comprising:
    a second motor configured to generate a rotational torque for driving a second seatbelt retractor, and
    said second micro computer controls said second motor based on the selected driving mode.

5. The seatbelt retractor controlling system according to claim 4, wherein
    said second electric control unit integral with said second motor and is connected electrically with said second motor through a electric power line which transmits a driving current to said second motor.

6. The seatbelt retractor controlling system according to claim 4, wherein
    said second seatbelt retractor is attached to the driver's seat and rolls round the seat belt by the driver's seat.

7. The seatbelt retractor controlling system according to claim 6, wherein
    said second seatbelt retractor is attached to a seat which is different from the driver's seat and rolls round the seat belt by the seat.

8. The seatbelt retractor controlling system according to claim 1, wherein
said first micro computer further comprises a second motor control portion which receives a signal of a buckle switch installed in said seatbelt retractor directly without passing said second micro computer, selects the predetermined driving modes based on the buckle switch signal, and controls a driving current supplied to said motor based on the selected driving mode.

9. The seatbelt retractor controlling system according to claim 4, wherein
said first micro computer further comprises a second motor control portion configured to receive a signal of a buckle switch installed in said seatbelt retractor directly without passing said second micro computer, select the predetermined driving modes based on the buckle switch signal, and control a driving current supplied to said motor based on the selected driving mode.

10. The seatbelt retractor controlling system according to claim 8, wherein
said second motor control portion is configured to select a driving mode which retracts the seat belt when a closed buckle switch is opened.

* * * * *